United States Patent [19]

Alverio

[11] Patent Number: 5,201,616
[45] Date of Patent: Apr. 13, 1993

[54] HOLE FINISHING TOOL WITH IMPROVED AXIAL ALIGNMENT

[75] Inventor: John Alverio, Shelby Township Oceana County, Mich.

[73] Assignee: General Motors Corporation, Detroit, Mich.

[21] Appl. No.: 871,790

[22] Filed: Apr. 21, 1992

[51] Int. Cl.$^5$ .............................................. B23B 51/02
[52] U.S. Cl. .................................... 408/224; 408/229
[58] Field of Search ............... 408/224, 223, 199, 227, 408/229, 714, 165, 127, 30, 26, 27, 22, 230

[56] References Cited

U.S. PATENT DOCUMENTS

| | | | |
|---|---|---|---|
| 1,409,921 | 3/1922 | Buck | 408/229 |
| 1,643,679 | 9/1927 | Roderick | 408/223 X |
| 2,030,846 | 2/1936 | Bishton | 408/165 |
| 2,063,753 | 12/1936 | Pohlman | 408/229 |
| 2,369,120 | 2/1945 | Ferries | 26/108.1 |
| 2,409,616 | 10/1946 | De Bruin et al. | 408/224 |
| 2,923,181 | 2/1960 | Grage | 408/229 |
| 3,199,382 | 8/1965 | Andreosson | 408/229 X |
| 4,091,525 | 5/1978 | Tarasiewicz et al. | 408/229 |
| 4,231,693 | 11/1980 | Kammeraad | 408/230 |
| 4,844,670 | 7/1989 | Heule | 408/224 |

FOREIGN PATENT DOCUMENTS

| | | | |
|---|---|---|---|
| 2590191 | 5/1987 | France | 408/199 |
| 0102524 | 6/1984 | Japan | 408/199 |
| 0039018 | 2/1985 | Japan | 408/199 |
| 0948564 | 8/1982 | U.S.S.R. | 408/199 |
| 554960 | 7/1943 | United Kingdom | 408/227 |
| 847197 | 9/1960 | United Kingdom | 408/226 |

*Primary Examiner*—Daniel W. Howell
*Attorney, Agent, or Firm*—Patrick M. Griffin

[57] ABSTRACT

A hole reamer takes a rough, undersized hole to final size while providing better correction of any initial axial mislocation of the hole. A pair of cutting sections, a smaller diameter lead cutting section and a larger diameter trailing cutting section, are axially separated by a relieved section of smaller diameter. The relieved section is small enough in diameter that it does not make contact with the hole, and is longer axially than the hole is thick. When the lead section enters the hole, it is bent off axis slightly, but the reamer shifts back on axis when the relieved section enters the hole. Thus, the trailing, final hole sizing section is back on axis as it works to finish the hole, bringing it closer to the desired axial location.

2 Claims, 3 Drawing Sheets

HOLE FINISHING TOOL WITH IMPROVED AXIAL ALIGNMENT

This invention relates to hole finishing tools generally, and specifically to such a tool that takes a workpiece hole from a rough diameter to a final diameter with improved axial alignment.

BACKGROUND OF THE INVENTION

Holes through workpieces, such as metal plates, typically have an initial, rough diameter that is less than their desired final diameter, and are also axially misaligned from a desired design axis. Such holes are often predrilled by a conventional drill, and then taken to final size by a reamer, which cuts more finely and smoothly than the drill. The axial misalignment adversely affects the work of the reamer, however. The reamer is rotated about the design axis, but it enters a smaller diameter hole that is slightly offset from its axis of rotation, the design axis. The reamer to hole radial interference caused by the offset can bend the reamer slightly and shift it off of the design axis as it rotates. As a consequence, the finished hole, though brought to final diameter and brought closer to the design axis, will still be slightly offset from the design axis. The greater the original offset, the worse the final hole misalignment. In addition, the smaller the reamer diameter, the more subject the reamer is to bending. The degree of initial bending as the reamer enters the hole can be reduced with a stepped reamer. A stepped reamer has a smaller diameter first section, which creates less hole to tool interference, causing less initial tool bending. Though reduced, the tool remains bent as the larger second section enters the hole, so there is still some final hole mislocation.

SUMMARY OF THE INVENTION

The invention provides a novel hole finishing tool, a reamer with stepped diameters separated axially by a noncutting section that acts to relieve tool bending and the consequent hole misalignment.

In the embodiment disclosed, the workpiece hole has a rough diameter less than the desired finish diameter, a length equal to the thickness of the workpiece, and an axis that is offset from the ideal, design axis. The reamer has a lead cutting section with an diameter greater than the hole rough diameter, but not as great as the desired finish diameter. Therefore, its radial interference with the rough hole is lessened, but it is not capable of taking the hole to final size. The reamer also has a trailing cutting section with a diameter equal to the desired hole final diameter, which can take the hole to final size. Separating them axially is a noncutting relieved section, a turned down cylindrical portion with a diameter less than the lead cutting section, sufficiently less so that it clears the hole. It is also longer than the workpiece is thick.

In use, the reamer is rotated about the design axis and driven down into the hole. When the lead section of the reamer hits the rough hole, the radial interference between the two causes a slight bending of the reamer away from the design axis, though less than would be the case with a full diameter cutting section. The lead section enlarges the hole until the noncutting relieved section is reached, at which point the noncutting section moves into the hole. Because of its reduced diameter, the relieved section has no radial interference with the hole, and the reamer is therefore allowed to shift back on axis. When the larger diameter, trailing cutting section moves into the hole, it is rotating on the design axis, not bent away from it. Therefore, as it takes the hole to final diameter, the trailing cutting section also acts to correct the hole axial location. The reamer is operated in the same way as a conventional reamer, and is not significantly more expensive to produce.

It is, therefore, a general object of the invention to bring a rough workpiece hole to final size with improved axial alignment.

It is another object of the invention to provide a reamer to do so that can be used in the same way as a conventional reamer.

It is another object of the invention to improve final hole axial location by allowing the reamer to shift back onto design axis during the reaming process.

It is still another object of the invention to provide a reamer that has a reduced diameter relieved section axially separating a first and second cutting section, which has no radial interference with the hole, and so lets the reamer shift back on axis.

DESCRIPTION OF THE PREFERRED EMBODIMENT

These and other objects and features of the invention will appear from the following written description, and from the drawings, in which.

Figure 1:
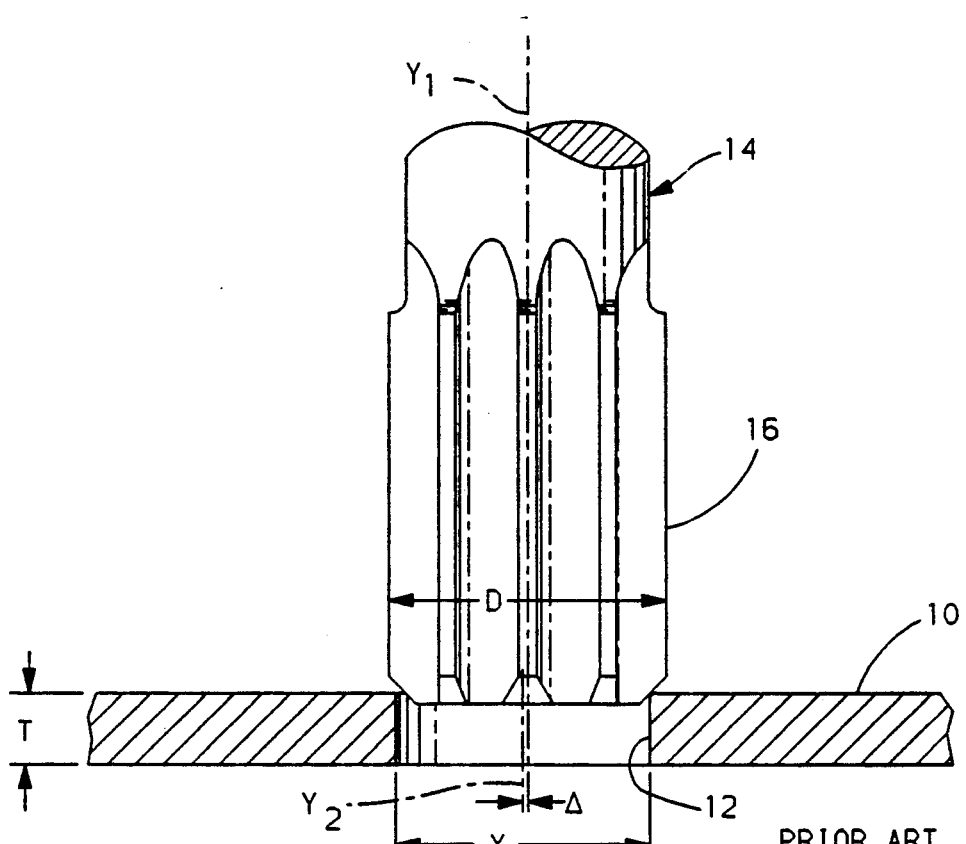
FIG. 1 is a side view of the cutting end of a prior art reamer and a cross sectioned workpiece with a rough hole.

Referring first to FIG. 1, a workpiece, in this case a piece of flat stock (10) of thickness T, has a rough hole (12) predrilled or otherwise formed therein with a rough diameter X that is smaller than its desired finish diameter. Hole (12) is located on an axis $Y_2$ which is slightly offset or misaligned from its ideal or design axis $Y_1$, by a differential $\Delta$. A conventional reamer, indicated generally at (14) has a cutting end (16) with an edge to edge diameter D greater than X, matching the desired final diameter for hole (12). If the only problem with the initial hole (12) were the fact that it needed to be brought up to final size, then a conventional reamer like (14) would be more than adequate. That is, if $Y_1$ and $Y_2$ were coincident, with no offset, then reamer (14) would have a radial interference with rough hole (12) as it entered, but there would be no unbalanced radial force tending to bend it off axis. As it is, with hole (12) being misaligned to the left by $\Delta$, there is an unbalanced radial force that would tend to bend reamer (14) to the left as well, shifting it off the ideal axis $Y_1$, leaving the final sized hole (12) off axis as well.

Figure 2:
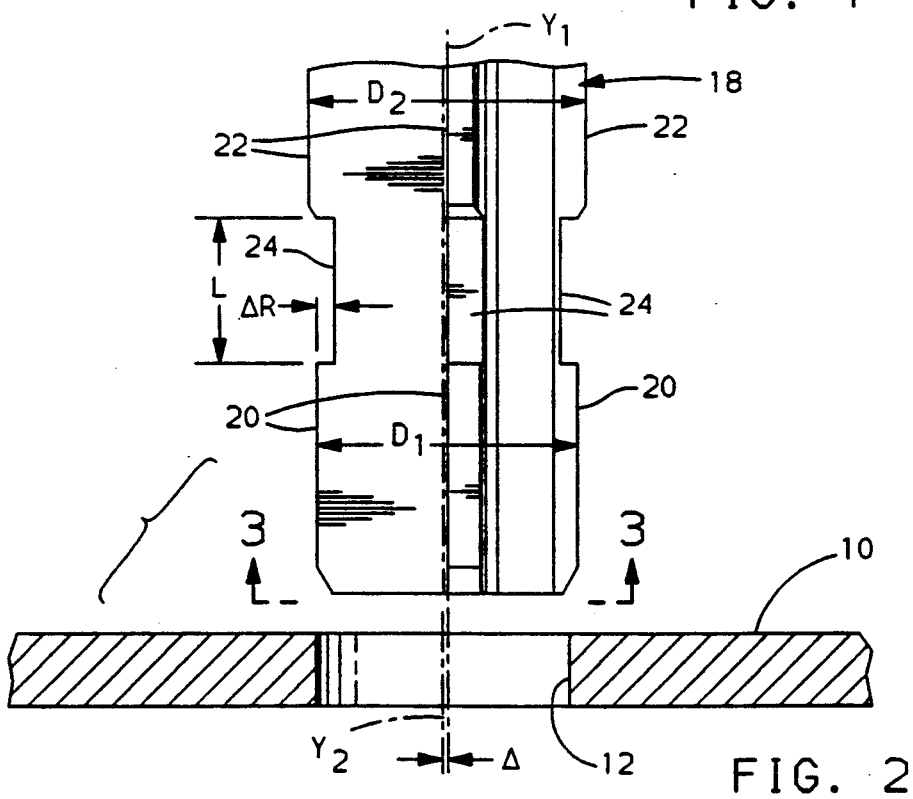
FIG. 2 shows the same workpiece hole, but shows a side view of the end of a reamer made according to the invention.
Figure 3:
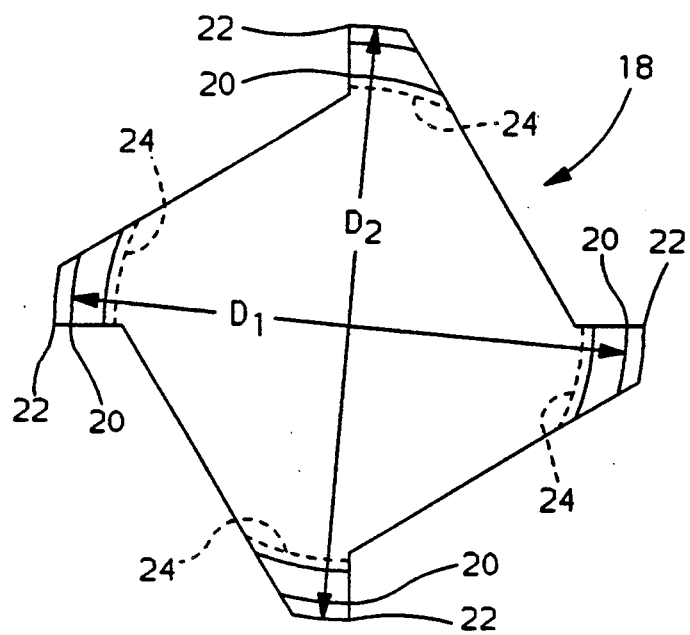
FIG. 3 is an end view of the reamer from the perspective of 3—3 in FIG. 2.

Referring next to FIGS. 2 and 3, a preferred embodiment of the hole finishing tool of the invention, a reamer indicated generally at (18), is used with the same workpiece (10) and hole (12). Reamer (18) is a four-flute design machined from cylindrical stock of suitable high speed steel, carbide, or the like, with a cutting end comprised not of one, but of three sections. A first, lower cutting section is comprised of four evenly spaced lead cutting edges (20), which lie on a cylinder with a diameter $D_1$ that is greater than X, but less than the desired final diameter of hole (12). A second, upper cutting section is comprised of four evenly spaced trailing cutting edges (22), which lie on a cylinder that has the desired final diameter for hole (12), $D_2$. Axially separating the two cutting sections is a relieved, noncutting section comprised of four notches (24), which lie on a cylinder coaxial with the lead cutting edges (20) and trailing edges (22). The notches (24) lie on a cylinder with a diameter less than $D_1$, enough less that they have a radial differential $\Delta R$ relative to the lead cutting edges (20) sufficient to clear hole (12). One way to assure that the notches (24) had clearance would be to make $\Delta R$ comparable to $\Delta$. The length of the notches (24), indicated at L, is deliberately greater than the stock thickness T, for a reason described below.

Figure 4:
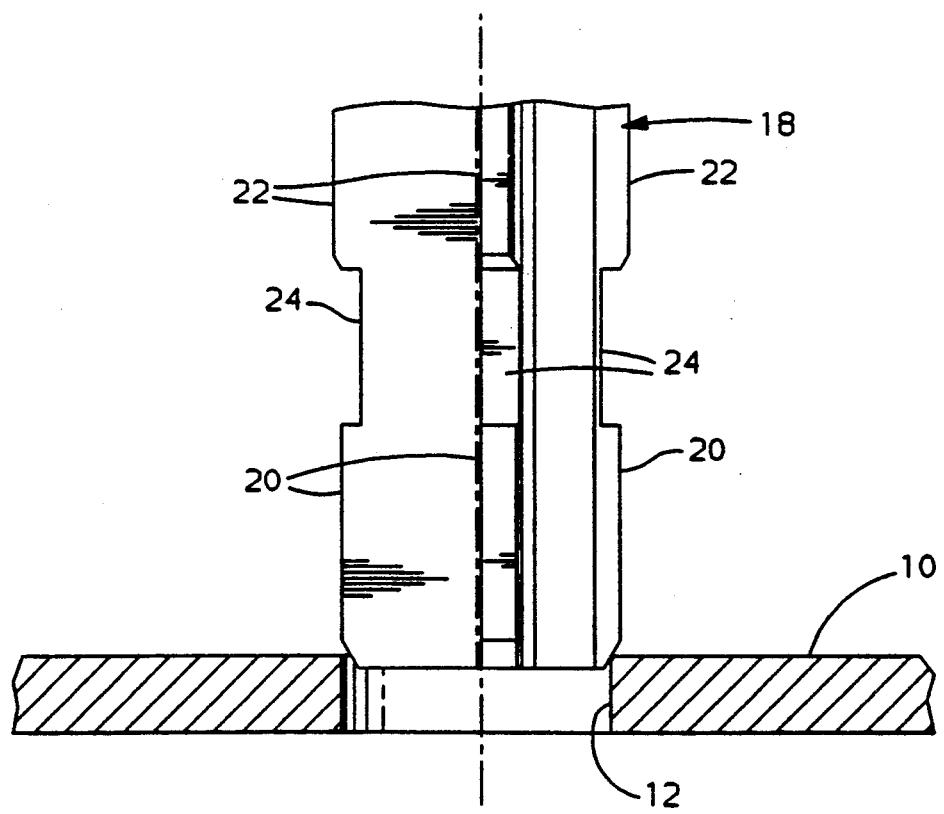
FIG. 4 shows the leading section of the reamer entering the rough hole.
Figure 5:
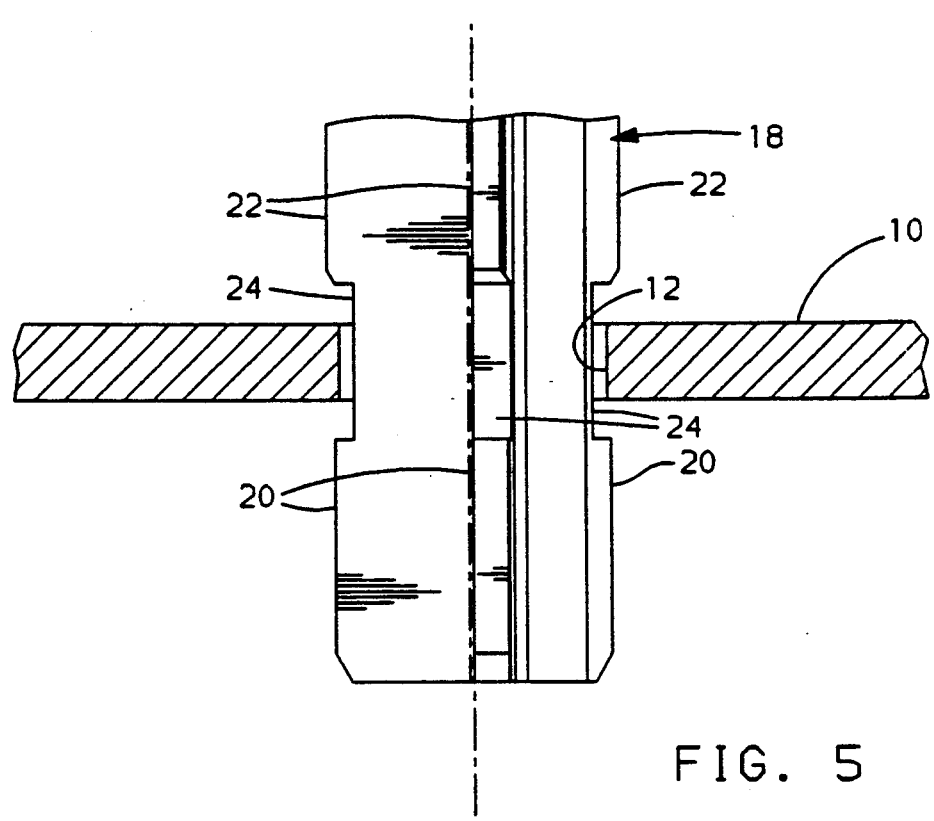
FIG. 5 shows the noncutting relieved section within the hole.
Figure 6:
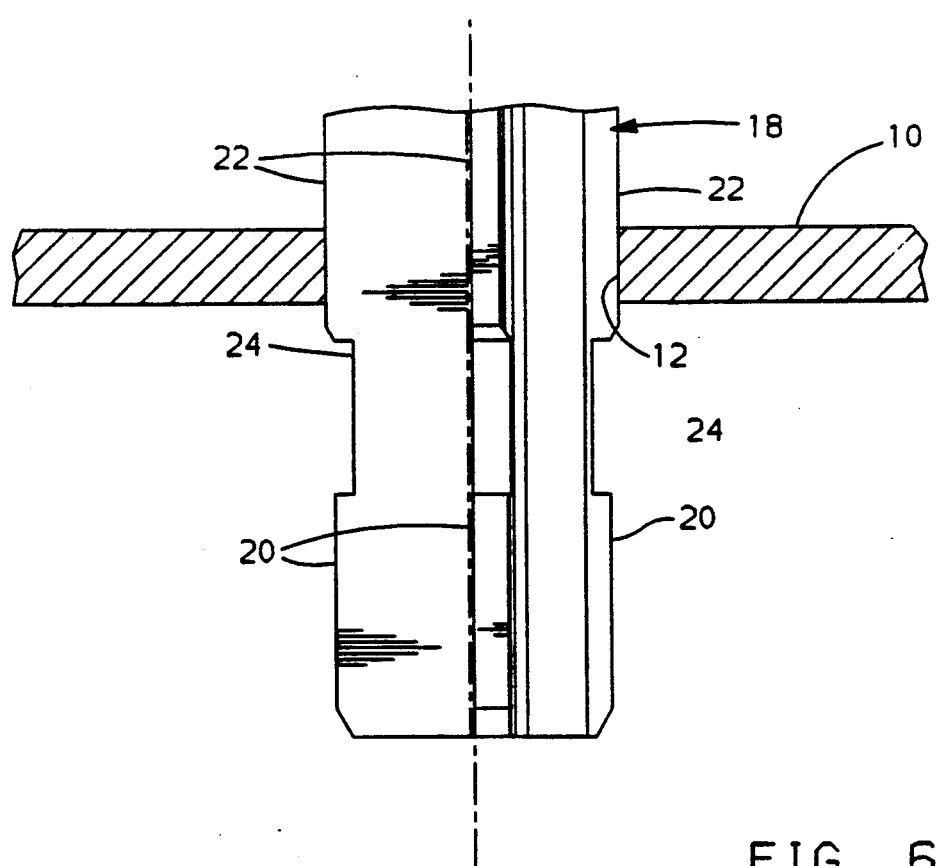
FIG. 6 shows the larger trailing section in the hole.

Referring next to FIGS. 4 through 6, the dimensions of reamer (18) described above allow it to operate so as to improve the final accuracy of hole (12). Reamer (18) is rotated about the design axis and driven down, just as a conventional reamer (14) would be. It engages hole (12) with a radial interference, since X is less than $D_1$, which causes the lead cutting edges (20) to cut the surface of hole (12). Furthermore, because the hole (12) is misaligned and axially offset to the left by $\Delta$, the lead cutting edges (20) hit the right side of hole (12) with greater force, which causes the reamer (18) to bend off axis slightly to the left. That bending is not illustrated as such. However, as noted above, the degree of radial force imbalance and consequent bending is less than it would be if $D_1$ were the same as $D_2$, and reamer (18) is not bent off of the design axis $Y_1$ to the same degree that hole (12) is originally mislocated. As the lead cutting edges (20) bore through hole (12), they enlarge it from its original diameter X to $D_1$, but the reamer (18) remains under some bending tension.

Referring next to FIGS. 5 and 6, once the lead cutting edges (20) have passed through hole (12), hole (12) is closer to the ideal axis $Y_1$, because of the work done by the the lead cutting edges (20). Next, as shown in FIG. 5, the notches (24) move into hole (12), and reamer (18) can relax and shift back to the design axis $Y_1$, because the notches (24) do not hit the surface of hole (12). Finally, as reamer (18) is driven farther in, the trailing cutting edges (22) move into the already enlarged hole (12), as shown in FIG. 6. Reamer (18) is shifted off of the ideal axis $Y_1$ even less by the engagement of the trailing cutting edges (22) with hole (12), because hole (12) has already been enlarged and partially corrected for axial location, and also because the trailing cutting edges (22) are farther up the axis of reamer (18), and at a wider part of reamer (18), where it is stiffer and less subject to bending. The trailing cutting edges (22) work to bring hole (12) up to final diameter, $D_2$, and correct it farther toward the design axis $Y_1$, enough so that the finished hole (12) is not significantly mislocated from the design axis $Y_1$. Workpiece (10) does not have to be refixtured, nor does reamer (18) have to be actively shifted, in order to achieve the extra accuracy. Reamer (18) automatically and passively self corrects.

In conclusion, hole (12) is final sized and its axial location error substantially corrected by a reamer (18) that is operated conventionally, but which behaves differently because of its novel structure. Variations in the disclosed embodiment could be made. It would be possible to divide the tool up into more than two separated sections. For example, three cutting sections, one lead section and two trailing sections, each with a progressively greater diameter, could be separated by two relieved sections. Each time a cutting section passed through the hole, the tool would be allowed to relax and shift back to the design axis, bringing the hole incrementally and progressively to final size and proper axis. In theory, any number of axially adjacent pairs of progressively larger cutting sections could be used, each pair separated by a radially reduced relieved section. The same concept could be applied to other hole finishing tools, as well, such as grinders or hones, not just to reamers per se. Therefore, it will be understood that it is not intended to limit the invention to just the embodiment disclosed.

The embodiments of the invention in which an exclusive property or privilege is claimed are defined as follows:

1. A hole finishing tool for use in final sizing a rough hole in a workpiece of predetermined thickness, said hole having its axis misaligned from a desired hole design axis and having a rough diameter less than a desired final diameter, said tool comprising, a series of generally cylindrical cutting sections, each axially adjacent to a trailing cutting section and each having a progressively larger diameter that is still less than the hole final diameter, but for the final cutting section, which has a diameter substantially equal to the hole final diameter, and, a relieved, noncutting section in said tool axially separating each adjacent pair of cutting sections each of said relieved sections separating an adjacent pair of cutting sections and having a reduced diameter, relative to said cutting sections, sufficient to clear said hole, and an axial length greater than said workpiece thickness, whereby, when said tool is rotated about said design axis and driven toward said hole, said cutting sections enter said hole one after another, enlarging said hole progressively, with said relieved sections allowing said tool to shift back to said design axis to relieve any axial bending of said tool away from said design axis caused by radial interference of said hole with the preceding cutting section, thereby taking said hole to final diameter and nearer to said design axis.

2. A hole finishing tool for use in final sizing a rough hole in a workpiece of predetermined thickness, said hole having its axis misaligned from a desired hole design axis and having a rough diameter less than a desired final diameter, said tool comprising, a generally cylindrical lead cutting section having a diameter greater than said rough diameter but less than said final diameter, a generally cylindrical trailing cutting section having a diameter substantially equal to said final diameter, and, a relieved, noncutting section in said tool axially separating said lead and trailing cutting sections and having a radial differential, relative to said lead cutting section, sufficient to clear said hole, and an axial length greater than said workpiece thickness, whereby, when said tool is rotated about said design axis and driven toward said hole, said lead cutting section enters said hole first, bending said tool away from said design axis slightly but taking said hole closer to final diameter, after which said relieved section enters said hole, allowing said tool to shift back to said design axis before said trailing cutting section enters said hole to take it to said final diameter and nearer to said design axis.

* * * * *